United States Patent
Nystad et al.

(10) Patent No.: US 8,332,583 B2
(45) Date of Patent: Dec. 11, 2012

(54) SYSTEMS AND METHODS TO PROVIDE APPLICATIONS TO MICROPROCESSOR SYSTEMS USING A HARDWARE ELEMENT ON A DISTRIBUTION MEDUIM

(75) Inventors: Jørn Nystad, Trondheim (NO); Mario Blazevic, Snarøya (NO); Borgar Ljosland, Trondheim (NO); Edvard Sørgård, Hundmaren (NO); Frank Langtind, Melhus (NO)

(73) Assignee: FXI Technologies AS, Oslo (NO)

( * ) Notice: Subject to any disclaimer, the term of this patent is extended or adjusted under 35 U.S.C. 154(b) by 785 days.

(21) Appl. No.: 11/722,512

(22) PCT Filed: Dec. 21, 2005

(86) PCT No.: PCT/GB2005/004967
§ 371 (c)(1),
(2), (4) Date: Feb. 19, 2010

(87) PCT Pub. No.: WO2006/067435
PCT Pub. Date: Jun. 29, 2006

(65) Prior Publication Data
US 2010/0146202 A1    Jun. 10, 2010

(30) Foreign Application Priority Data
Dec. 21, 2004 (GB) .................................. 0427973.3

(51) Int. Cl.
*G06F 12/14* (2006.01)
(52) U.S. Cl. .................... 711/115; 711/152; 711/163
(58) Field of Classification Search ............ 711/115, 711/152, 163
See application file for complete search history.

(56) References Cited

U.S. PATENT DOCUMENTS

| | | | |
|---|---|---|---|
| 5,004,232 A | 4/1991 | Wong et al. | |
| 5,599,232 A | 2/1997 | Darling | |
| 5,724,497 A | 3/1998 | San et al. | |
| 5,850,230 A | 12/1998 | San et al. | |
| 6,006,319 A | 12/1999 | Takahashi et al. | |
| 6,190,257 B1 | 2/2001 | Takeda et al. | |
| 6,516,202 B1 | 2/2003 | Hawkins et al. | |
| 6,646,653 B2 | 11/2003 | San et al. | |
| 7,065,651 B2 * | 6/2006 | Evans | 713/189 |
| 7,337,329 B2 * | 2/2008 | Evans | 713/189 |
| 7,418,344 B2 | 8/2008 | Holtzman et al. | |

(Continued)

FOREIGN PATENT DOCUMENTS
EP    0553532    4/1993
(Continued)

OTHER PUBLICATIONS

International Application No. PCT/GB2005/004967, International Search Report and Written Opinion, Jul. 5, 2006.

(Continued)

*Primary Examiner* — John Lane
(74) *Attorney, Agent, or Firm* — Greenberg Traurig, LLP

(57) ABSTRACT

A distribution medium (20) for providing an application to a host system (4) includes an interface element (21) for interfacing with the host (4), a memory or storage module (22) that stores application code representing the application and a hardware element (23). The hardware element (23) directly accesses application content stored in the memory (22), processes that application content to transform it to another form, and then provides the transformed content to the host system (4).

18 Claims, 6 Drawing Sheets

U.S. PATENT DOCUMENTS

| | | | |
|---|---|---|---|
| 2003/0028699 | A1 | 2/2003 | Holtzman et al. |
| 2003/0135742 | A1* | 7/2003 | Evans .......................... 713/189 |
| 2005/0125619 | A1* | 6/2005 | Evans .......................... 711/163 |
| 2008/0288700 | A1 | 11/2008 | Holtzman et al. |
| 2008/0295167 | A1 | 11/2008 | Holtzman et al. |

FOREIGN PATENT DOCUMENTS

| | | | |
|---|---|---|---|
| EP | 0553532 | A3 | 8/1993 |
| EP | 0571138 | | 11/1993 |
| EP | 0724220 | | 7/1996 |
| EP | 0724220 | A1 | 7/1996 |
| EP | 0780771 | | 6/1997 |
| EP | 0875816 | | 4/1998 |
| EP | 0844554 | | 5/1998 |
| EP | 1168185 | A2 | 1/2002 |
| GB | 2395323 | | 1/2006 |
| GB | 2416054 | | 2/2006 |
| WO | 96/01451 | | 4/1995 |
| WO | 9516238 | A1 | 6/1995 |
| WO | 0143129 | A1 | 6/2001 |
| WO | 03/012657 | | 2/2003 |
| WO | 03012657 | A2 | 2/2003 |
| WO | 2005038559 | A2 | 4/2005 |
| WO | 2006069194 | A2 | 6/2006 |

OTHER PUBLICATIONS

Falanx Microsystems AS, "Falanx Mali 100 Product Specification," Jul. 12, 2004.

Bensaali, F. et al., "An FPGA Based Coprocessor for 3D Affine Transformations," Proceedings of the 2003 IEEE International Conference on Field-Programmable Technology, pp. 288-291, Dec. 15, 2003.

Marrin, K., "Plug-In Boards Transform PCs into Floating-Point Workstations," Computer Design, vol. 25, No. 4, pp. 31-34, Feb. 15, 1986.

Knittel, G., "A PCI-Compatible FPGA-Coprocessor for 2D/3D Image Processing," internet article, Jun. 12, 2006.

San Diego State University, CCD Lab, "Utility Board," internet article, Jan. 17, 1997.

US Ultratek, Inc., "DSPUT5000 Ultrasonic Pulser/Receiver and A/D Board for PCI Bus with DSP Chip," product specification, Aug. 10, 2003.

Roncella, R. et al., "Single-Chip Adaptive FIR Filter for Acoustic Echo Canceller Board," Signal Processing, vol. 27, No. 3, pp. 347-358, Jun. 1, 1992.

Omar, J. et al., "Prototyping PC-AT Card with DSP Chip for CT Applications, using an FPGA-Based Rapid Prototyping Framework," IEEE Colloquium on DSP Chips in Real-Time Instrumentation and Display Systems, Digest No. 1997/300, pp. 1/1-1/5, Sep. 24, 1997.

Verderber, M. et al., "HW/SW Partitioned Optimization and VLSI-FPGA Implementation of the MPEG-2 Video Decoder," Proceedings of the IEEE Design, Automation and Test in Europe Conference and Exhibition, pp. 238-243, Mar. 3, 2003.

Em, D., "Dawn of the New Millennium," Byte, vol. 22, No. 7, Jul. 1997.

Rathnam, S. et al., "An Architectural Overview of the Programmable Multimedia Processor, TM-1," Digest of Papers of the 1996 Computer Society Conference (Compcon '96): Technologies for the Information Superhighway, pp. 319-326, Feb. 25, 1996.

Wikimedia Foundation, Inc., "Graphics Processing Unit," Wikipedia online encyclopedia entry located at http://en.wikipedia.org/w/index.php?title=Graphics_processing_unit&oldid=9143301, Dec. 9, 2004.

GB Patent Application No. GB0526059.1, Search Report under Section 17, Mar. 16, 2006.

Wikimedia Foundation, Inc., "Super Nintendo Entertainment System," Wikipedia online encyclopedia entry located at http://en.wikipedia.org/wiki/Super_Nintendo, Mar. 14, 2006.

Hopper, D.I., "Visor Maker Expects Springboard to Jump-Start New PDA," Cable News Network (CNN) article located at http://www.cnn.com/TECH/ptech/9909/14/visor.springboard/, Sep. 14, 1999.

GB Patent Application No. GB0526059.1, Further Search Report under Section 17, Apr. 4, 2007.

Victor Green & Company, Patent and Technical Information Specialists, subject matter search report for "Distribution Media for Computer Games" (Jan. 4, 2006).

* cited by examiner

SYSTEMS AND METHODS TO PROVIDE APPLICATIONS TO MICROPROCESSOR SYSTEMS USING A HARDWARE ELEMENT ON A DISTRIBUTION MEDUIM

The present invention relates to microprocessor systems and in particular to a distribution medium for applications for microprocessor-based systems.

Many applications, such as games, audio or video content, databases, software, etc., for microprocessor-based systems are distributed to users in the form of distribution media, such as disks, memory cards, memory cartridges, etc. The distribution medium contains the "application code" (i.e. data and programs, etc.), etc., that is necessary for a host microprocessor system to use and execute the application. As is known in the art, this application code is typically stored in a binary form on the distribution medium such that it can be accessed and executed by the host system, i.e. such that in effect the distribution medium stores a binary representation of the application.

Any given application will typically comprise two distinct components, namely a set of processes that are to be carried out as part of the application, and the application content, i.e. information and data, that is to be used when the application is executed (and, e.g., that the application processes are to operate on).

For example, a game can usually be considered to consist of two main components, namely a game engine which comprises processes for performing graphics, audio, artificial intelligence, physics, user input/output, etc., operations or processes, and the relevant data and information, i.e. game content, that is to be processed by these processes as part of the game, which content can include, for example, audio, graphics (e.g. meshes, objects, textures), video, images, etc., information and data.

Thus, where an application is provided in the form of (binary) application code that is stored on a distribution medium, the application content will be provided as stored data on the distribution medium, and the application processes will be provided as stored program code (i.e. software) on the distribution medium, which program code is in use to be loaded onto and executed by the host system to allow the host system to perform the relevant application processes defined by the program code.

In other words, the application code stored on the distribution medium will typically include application program code (being the application code that defines rules, programs and processes that are to be carried out when the application is executed), and application content (being the data or information that is to be (or can be) processed by the application (or other, e.g. host), processes).

A typical distribution medium is shown in FIG. 1. The distribution medium 1, which can be any suitable device that can store (binary) data representing an application, includes a storage or memory means 2 that can store data, and an interface element 3 to allow a host system 4 to access the data stored in the memory 2.

As is known in the art, the interface element 3 will typically be a sub-system on the distribution medium 1 that will implement an interface protocol that enables a host system to access the data stored in the memory 2.

The memory or storage medium 2 can be of any suitable form, such as a semi-conductor, optical or magnetic medium that can store (binary) data, and stores (in a binary form in this arrangement) the application code 5 that in effect represents and is the application (e.g. game) that the distribution medium 1 makes available to the host 4. In this type of arrangement, the application is stored in the form of a binary representation of the "application" in the storage medium 2 of the distribution medium 1.

FIG. 2 shows in more detail the typical operational arrangement when a host system 4 is executing an application stored on such a distribution medium 1.

In this example, the host 4 is assumed to be a CPU-based (Central Processing Unit based) system capable of accessing the interface element 3 of the distribution medium 1.

The host system 4 includes its own host storage or memory 10, a CPU 11, a logic/IO unit 12 and an interface element 13 for interfacing with the distribution medium 1, as is known in the art.

In this arrangement, as is known in the art, when the host 4 executes the application stored on the distribution medium 1, it will typically copy some or all 14 of the application code 5 (both application process code (logic) and application content) stored on the distribution medium 1 to its own host memory 10, as shown in FIG. 2. The CPU 11 or other controlling circuit on the host 4 will then be the platform that executes the application program code and transforms and processes, etc., the application content.

This type of arrangement requires the host system 4 to be able to access all of the application code on the distribution medium 1. This leads to a risk of that code being copied. It is possible and known to encrypt the application code to try to prevent its copying and unauthorised distribution. However, the decryption method must be provided to the host, thereby potentially still allowing a hostile host to decrypt and then distribute the decrypted application code in an unauthorised manner.

The Applicants believe therefore that there remains scope for improvement to the protection of applications for microprocessor systems that are distributed using distribution media for execution by a host system.

According to a first aspect of the present invention, there is provided a distribution medium for an application for a microprocessor-based system, which application includes both application content and an application process or processes, the distribution medium comprising:

means for storing application content for the application; and means for implementing at least a part of the application process or processes in hardware.

According to a second aspect of the present invention, there is provided a distribution medium for an application for a microprocessor-based system, comprising:

memory means for storing code representing the application; and a hardware element for providing a process or processes of the application.

According to a third aspect of the present invention, there is provided a distribution medium for an application for a microprocessor-based system, the distribution medium storing application code for the application and characterised in that some or all of the process or processes of the application is implemented in hardware on the distribution medium.

According to a fourth aspect of the present invention, there is provided a method of operating a microprocessor-based system that includes a host system for executing an application, and a distribution medium for providing the application to the host system, the method comprising:

executing processes of the application both on the host system and in hardware on the distribution medium.

According to a fifth aspect of the present invention, there is provided a method of making a distribution medium for an application for a microprocessor-based system, which application includes both application content and an application process or processes, the method comprising:

providing in the distribution medium hardware for providing at least a part of the application process or processes.

In the present invention, some or all of the processes that are part of (and, e.g., defined in and by) the application are implemented in and thus provided by hardware on the distribution medium (rather than, for example, being provided in the form of stored program code that is to be executed on the host system). In other words, some of the processes that are part of the application are represented in hardware on the distribution medium.

This has the effect that those application processes do not need to be implemented on and accordingly accessible to the host system. Furthermore, because those processes are implemented in hardware, it is or can be made much more difficult for a hostile party to deduce or gain access to them (and accordingly, e.g., to reproduce them). Thus, not only need the application processes that are implemented in hardware on the distribution medium not be made available to the host, it is or can be made much more difficult to remove or deduce those application processes from the distribution medium in any event.

The present invention accordingly provides a distribution medium that has, inter alia, significantly enhanced copy-protection.

In effect, the present invention adds a (hardware) processing element to the distribution medium for carrying out some or all of the application processes of the application in question, thereby removing the need for the host system to be able to directly access and use those application processes.

The application processes can be implemented in hardware in any suitable manner, e.g., by providing an appropriate logic processing element. In one preferred embodiment a hardware element that uses semiconductor technology, such as a semiconductor device, e.g., in the form of any suitable silicon implementation comprising transistors, or other firm entities, etc., is used for this purpose. However, other suitable hardware elements, such as biological material, neural networks, optical or quantum arrangements, etc., could also be used to implement the application processes, if desired.

The application process or processes that is implemented in hardware can be selected as desired. Some or all of the application processes may be implemented in hardware on the distribution medium, although in practice it may be preferred to only implement some of the application processes in hardware on the distribution medium, while leaving the rest still to be executed on the host system. Equally, for any given application process (that, e.g., can be distinctly identified), while it is preferred for all of that process to be implemented in hardware on the distribution medium (where that process is to be implemented in that hardware), this is not necessary and so a part of the process could be implemented in hardware on the distribution medium, with the rest of the process being, e.g., stored as program code for access by, and implementation on, the host system.

In a preferred embodiment, the application process or processes that is implemented on the distribution medium relates to or is a distinct or distinctly identifiable part of the application's processes, e.g., a part that carries out a stand-alone process as part of the application. For example, in the cases of computer games, the game application will typically include processes for transforming graphics application content stored on the distribution medium when drawing the graphics for the game. Other games may include graphics processes for, e.g., implementing graphics processing steps. In prior art systems these graphics processes are provided in the form of stored program code for implementation and execution on the host system, as discussed above.

Such graphics processes typically will "stand alone" and therefore would be particularly suited for implementation in hardware on a distribution medium for the game. Thus, in a particularly preferred embodiment, (where appropriate) the application process or processes that is implemented in hardware on the distribution medium is (or includes) graphics processes. In a particularly preferred arrangement, this is achieved by including a graphics processing platform or rendering module on the distribution medium.

Indeed, it is believed that such an arrangement may be new and advantageous in its own right. Thus, according to a sixth aspect of the present invention, there is provided a distribution medium for a computer game, in which the game includes one or more graphics processing processes, and in which all or part of the graphics processes defined by the game are provided as a hardware graphics processing element included in the distribution medium.

This arrangement has the advantage that not only will the graphics processing processes of the game (which typically would be an important aspect of the game) have enhanced copy-protection (because they are implemented in hardware on the distribution medium), but also that the host system will no longer have to perform that processing (because the graphics processing for the game is now implemented in hardware on the distribution medium), i.e. the graphics processing is offloaded from the host to the distribution medium. It also has the further advantage that because the graphics processing will be implemented on the distribution medium, the graphics performance and visuals, etc., will be determined by the hardware element on the distribution medium and can therefore be the same for all platforms, rather than being, e.g., subject to the performance capabilities of the host system.

Indeed, the Applicants have recognised that a further significant advantage of a distribution medium that includes a hardware element for providing some or all of the application's processes, as in the present invention, is that the hardware element on the distribution medium can accordingly be used to offload the processing of some or all of the application processes from the host system (i.e. such that they are instead carried out on the distribution medium). This could accordingly, be used to reduce the burden on the host's resources when executing the application and/or potentially even allow the application still to be executed on a host that may not itself include all the necessary resources.

For example, multimedia applications, such as 3D games can, typically, put a very high computational burden on a host device, thereby, e.g., requiring the host to include additional hardware resources, such as graphics processors. If these resources are provided and implemented in hardware on the distribution medium instead, as in the present invention, these problems can be alleviated or avoided.

Thus in a particularly preferred embodiment, the application process or processes that is implemented in hardware on the distribution medium comprises a process or processes that is, e.g., computationally expensive or burdensome for a host system to execute, such as, e.g., graphics processing.

Other suitable application processing elements that could be implemented in hardware on the distribution medium would be, e.g., audio and/or video codec (coding and decoding) logic, or more general, e.g., CPU, processes, programs or logic, included in the application.

The hardware element that is included on the distribution medium could, e.g., be specifically designed to implement (and, e.g., only implement) the application processes in question. It could, for example, comprise a hardware element, such as an application-specific integrated circuit (ASIC), specifically configured and dedicated to carrying out the process or processes in question. However, the hardware element could also be in the form of a more general hardware element (such as a more general ASIC) that is capable (amongst other things) of implementing the application processes in question. Thus, for example, where graphics processing processes of the application are to be implemented in hardware on the distribution medium, a suitable general purpose graphics processor could be (and, indeed, preferably is) provided in the distribution medium for that purpose, even though all the functionality of the graphics processor may not be necessary to implement the application processes in question.

As discussed above, the distribution medium of the present invention includes a storage or memory means that is capable of storing application code (e.g. content and/or program code), e.g. in the form of a binary representation of that code. The storage or memory means of the distribution medium can take any suitable form, such as being a semi-conductor, magnetic or optical storage means. (It should be noted here that the application processes implemented in hardware on the distribution medium preferably are not otherwise stored on the distribution medium (e.g. as program code) (or at least not in a form such that they can be accessed by a host system).)

The distribution medium may and preferably does also include other suitable elements known in the art for this type of device, such as, for example, where appropriate, an interface element to allow a host to interface with the distribution medium.

As will be appreciated from the above and by those skilled in the art, in addition to the application processes implemented in hardware on the distribution medium, the host system will also need to be provided with any remaining application code (such as the application "content" and any program code for any remaining application processes not implemented in hardware on the distribution medium (and that are accordingly to be provided as program code for execution on the host system)) necessary to allow it to execute the application.

In a preferred embodiment some and preferably all of this code is stored in the memory means of the distribution medium, from where it can be accessed as desired by a host system. Thus, in a preferred embodiment, the memory means of the distribution medium stores application code, such as, and preferably, application content, and, preferably, also program code representing one or more application processes.

In a preferred embodiment, some and preferably all of the application code to be stored in the distribution medium is stored on the distribution medium prior to its distribution (sale) and thus the methods and apparatus of the present invention for providing a distribution medium preferably comprise a step of or means for storing in a memory of the distribution medium application code, such as application content and/or program code, for the application.

As well as application code for the application being stored on and supplied to the host system by the distribution medium, as discussed above, it would be possible, e.g., for the host system to as well or instead retrieve application code that it needs from an alternative source, such as via a network (such as the Internet) which the host system can access. Thus, in a preferred embodiment, the host system can access and retrieve application code from a source other than the distribution medium, such as, and preferably, via a network (e.g. from a server of a network) to which the host system is or can be coupled. Thus, in a preferred embodiment, the host system can be arranged to download application code, such as application content, from, e.g. a server of the Internet.

In a particularly preferred such arrangement, the distribution medium is arranged to store commands and/or data to instruct and allow a host system to access and retrieve application code from an alternative source, e.g. a source external to the distribution medium (and preferably also to the host system). This will allow the host system to, e.g., upon execution of the application on the distribution medium recognise that it needs to retrieve application code from elsewhere, and then retrieve that application code as appropriate. This has the advantage that, e.g., rather than having to provide a new distribution medium whenever an application is changed or updated, instead only the application code to be retrieved by the host (e.g. that is stored on an external server of the Internet) needs to be updated or changed.

The data and/or commands that are stored on the distribution medium for use by the host system for this purpose can take any suitable and desired form. In a preferred embodiment, this data comprises at least a pointer, such as an Internet address, identifying where the relevant code (e.g. content) can be and is to be obtained from. Such a pointer could provide a direct address to the code or could use (and indeed, preferably does use) a more indirect (implicit) addressing arrangement, e.g. where the source and type of data are identified. In the latter arrangement in particular, preferably, e.g., a code location, such as a server location (address), and a (preferably unique) code (e.g. content) identifier (for the server) are provided. In preferred arrangements, an identifier for the distribution medium and/or an identifier for the device that the application is being executed on are also provided. Other data that could be and preferably is provided includes a mobile phone's SIM address, and/or an encryption key or keys (e.g. to allow encrypted transmission of the application code (data) to the host system). In a preferred embodiment, the distribution medium stores one or more identifier keys (e.g. containing this or other information) that will allow a host system to retrieve (e.g. download) application code from another source.

Most preferably in these arrangements, either the host system or the distribution medium also has installed on it an application to manage the code fetching from the external source (e.g. to perform the server lookup and manage the downloading of the code (data)).

It is believed that such arrangements may be new and advantageous in their own right. Thus, according to a seventh aspect of the present invention, there is provided a distribution medium for an application for a microprocessor-based system, which application includes an application process or processes, the distribution medium comprising:

means for storing data to allow a microprocessor-based system to retrieve application code for the application from a source external to the distribution medium; and means for implementing at least a part of the application process or processes in hardware.

According to a eighth aspect of the present invention, there is provided a distribution medium for an application for a microprocessor-based system, comprising:

memory means for storing data to allow a microprocessor-based system to retrieve application code for the application from a source external to the distribution medium; and a hardware element for providing a process or processes of the application.

According to an ninth aspect of the present invention, there is provided a distribution medium for an application for a microprocessor-based system, the distribution medium storing data to allow a microprocessor-based system to retrieve application code for the application from a source external to the distribution medium and being characterised in that some or all of the process or processes of the application is implemented in hardware on the distribution medium.

According to a tenth aspect of the present invention, there is provided a method of making a distribution medium for an application for a microprocessor-based system, which application includes an application process or processes, the method comprising:

providing in the distribution medium data to allow a microprocessor-based system to retrieve application code for the application from a source external to the distribution medium; and providing in the distribution medium hardware for providing at least a part of the application process or processes.

According to an eleventh aspect of the present invention, there is provided a method of operating a microprocessor-based system that includes a host system for executing an application, and a distribution medium for providing the application to the host system, the method comprising:

the host system using data stored on the distribution medium to retrieve code for the application from a source external to the distribution medium; and executing a process or processes of the application in hardware on the distribution medium.

As will be appreciated by those skilled in the art, these aspects and embodiments of the invention can and preferably do include, as appropriate, any one or more or all of the preferred and optional features of the invention described herein.

Thus, for example, the distribution medium preferably also includes a memory means for storing application code for the application (and that preferably has application code pre-loaded into it prior to installation of the distribution medium in the host system). Similarly, the hardware element is preferably a dedicated hardware element for carrying out one or more application processes, such as and preferably graphics processes, although it could equally be a more general hardware element such as a CPU that implements (executes) program code (software) that implements some or all of the application process or processes (logic) (such an arrangement will be discussed in more detail below).

In a preferred embodiment of these arrangements, some of the application code is provided to the host system from the distribution medium (i.e. it is stored on the distribution medium for provision to the host system), and some of the application code is provided via the alternative, external source. However, it would also be possible, e.g., for all the application code required by the host system to be retrieved from the external source (i.e. with none of it being provided by the distribution medium). Thus, in a preferred embodiment the arrangement is such that the host system can and preferably does retrieve some or all of the application code that it requires from a source other than the distribution medium.

In a particularly preferred embodiment where the host system can retrieve application code from another source, the host system can then store retrieved application code on the distribution medium (e.g. in a or the memory of the distribution medium). This may be particularly desirable, e.g., where, as will be discussed further below, the hardware element of the distribution medium processes application content and, e.g., returns transformed application content (such as frame buffer data, in the case of graphics processes) to the host system.

The application code may be stored on the distribution medium in use in any suitable and desired manner. For example, where that code is already in the form required for use (required for executing the application), then the code could simply be loaded onto the distribution medium. If the code is not in a suitable form, then it can and should undergo some pre-processing before being stored in its form to be used on the distribution medium, such as to organise the code and to index the code in a desired and appropriate manner. Such processing of the code before storage is preferably carried out on the external system (e.g. host system), but could if desired be carried out on the distribution medium itself.

In a preferred arrangement where code is to be, e.g. downloaded, and then stored on the distribution medium, the host system can and will process any application program code (application logic) that it has retrieved (downloaded) so that it indexes application content and store the desired application content (e.g. application content that is to be transformed by (e.g. by the hardware element of) the distribution medium) in the memory on the distribution medium. It would also be possible, where appropriate (e.g. where the distribution medium includes a suitable programmable hardware element), to store some or all of the retrieved application program code on the distribution medium (e.g. for execution on the distribution medium).

Thus, in a particularly preferred embodiment, application code, such as application content, can be stored on the distribution medium in use, e.g., and preferably, by the host system. Thus, a host system can preferably store data, e.g., application code, on the distribution medium. Similarly, the distribution medium preferably comprises means for storing data received from an external source in use (which external source could be (and preferably is), e.g., a host system that is executing the application or an application that the distribution medium provides). Such data, e.g., application code, is preferably retrieved by the host system from a source external to the host system, but it could also or instead be code that is stored by the host system itself.

In these arrangements, the distribution medium could, e.g., already store some application code (e.g. content and/or program code), such that the data stored on it in use (e.g. by the host system) is in addition to the code already stored on the distribution medium. However, in one preferred arrangement, all of the application code to be stored on the distribution medium is provided to it in use (e.g. by the host system), i.e. such that the memory means of the distribution medium does not, in effect, have any application code pre-stored in it, but rather the application code to be stored on the distribution medium is provided to and stored in the memory of the distribution medium by the host system in use.

As discussed above, in use of the distribution medium of the present invention, some or all of the application processes will be executed by the hardware element on the distribution medium.

To facilitate this, the hardware element on the distribution medium may need to be able to, and, indeed, preferably can, access application content (e.g. and preferably stored on the distribution medium but also or instead stored in the host or elsewhere) so that it can process that content (and then, e.g., provide the processed content, e.g., to the host (or return it to memory)). In a particularly preferred embodiment, the application processes implemented in hardware on the distribution medium (i.e. the distribution medium's hardware element) can and preferably do access directly application content stored on the distribution medium (i.e. without the need for the host system to be involved in such access (indeed the host system need not necessarily even have any knowledge of the access at all)).

As well as the processes implemented in hardware on the distribution medium, it may be, and indeed typically will be, the case that, as will be appreciated by those skilled in the art, the host system will also need to carry out application related processes, and/or copy and/or process or execute application code. The application code that is processed or executed by the host system in these circumstances can, e.g., be stored on the distribution medium and retrieved therefrom by the host system, or could, e.g., be retrieved by the host system from elsewhere (e.g. an external source), e.g., upon instruction from the distribution medium, or a combination of the two, etc., as discussed above.

Thus, in a preferred embodiment of the present invention, the host system will, in use of the distribution medium, retrieve application code from the memory of the distribution medium and/or from a memory external to the distribution medium, and process that code. In one preferred arrangement the host can and will also, as discussed above, store code retrieved from a memory external to the distribution medium on (in a memory of) the distribution medium.

It is believed that some or all of the above arrangements may be new and advantageous in their own right.

Thus, according to a twelfth aspect of the present invention, there is provided a method of operating a microprocessor-based system that includes a host system for executing an application, and a distribution medium for providing the application to the host system, the distribution medium including a hardware element for executing one or more application processes, the method comprising:

the host system processing application code for the application; and the distribution medium executing one or more processes of the application using the hardware element of the distribution medium.

According to a thirteenth aspect of the present invention, there is provided a system for executing an application, the system comprising:

a host system for processing application code for the application; and a distribution medium comprising a hardware element for executing one or more processes of the application.

As will be appreciated by those skilled in the art, these aspects of the invention can and preferably do include any one or more or all of the preferred and optional features of the invention described herein.

Thus, for example, the application code that is processed by the host system can preferably be, and is preferably, retrieved by the host system from the distribution medium, or retrieved from a source other than the distribution medium (e.g., and preferably, in response to data stored on the distribution medium), or a combination of the two. Thus, the method and system of the present invention preferably further include a step of or means for the host system retrieving application code from the distribution medium, or from a source external to the distribution medium, or both, and then processing that code.

Similarly, the distribution medium can preferably store, and preferably does store, or include means for storing application code (e.g. application content).

It is accordingly similarly preferred for the host system to be able to, and to, store data on the distribution medium, preferably for processing by the hardware element of the distribution medium. This data is preferably retrieved from an external source, as discussed above.

Thus, according to a fourteenth aspect of the present invention, there is provided a method of operating a microprocessor-based system that includes a host system for executing an application, and a distribution medium for providing the application to the host system, the method comprising:

the host system storing code for the application on the distribution medium.

According to a fifteenth aspect of the present invention, there is provided a system for executing an application, the system comprising:

a host system for executing the application; and a distribution medium; wherein the host system further comprises means for storing code for the application on the distribution medium.

Again, as will be appreciated by those skilled in the art, these aspects of the invention can and preferably do include any one or more or all of the preferred and optional features of the invention described herein. Thus, for example, the application code that is stored on the distribution medium by the host system preferably comprises data that the host system has retrieved from an external source and preferably comprises, e.g., application content and/or code representing an application process or processes. Similarly, the distribution medium preferably comprises a hardware element for executing one or more processes of the application, and most preferably processes (and preferably transforms) some or all of the data stored on it in use by the host system (preferably using its hardware element, if provided), and, then, e.g., makes the processed data available to the host system.

The operations of the system can preferably be carried out upon instruction from the host system and/or hardware element on the distribution medium. The distribution medium accordingly preferably further includes any elements necessary to facilitate this data processing and communication.

The communication between the host and hardware element of the distribution medium can, e.g., be bi-directional, although this is not essential. The communication that is required and/or allowed will depend, e.g., on the particular application's hardware-software partitioning of the application's processes and the nature of the application's processes themselves.

Thus, for example, in a preferred embodiment, the distribution medium includes means for allowing a host system to instruct the hardware element of the distribution medium to perform an operation, etc., and/or means for allowing the hardware element of the distribution medium to instruct the host system to perform an operation, etc.

In such arrangements, the host system could, e.g., send the necessary commands to the hardware element on the distribution medium when that element is to perform an operation. However, in another preferred embodiment, the commands and data, etc., for the hardware element are stored on the distribution medium and the hardware element is able autonomously to fetch those commands and data and then use or execute them, etc., as it needs them. This would allow the hardware element on the distribution medium to act autonomously, without the need, e.g., for there to be 2-way communication between the hardware element and the host system.

It will be appreciated that in such arrangements, the host processor, for example, may need, for example, to instruct the hardware element on the distribution medium to carry out a particular process on certain application content that is stored on the distribution medium. While this operation could be carried out in any suitable manner, it is preferred for the distribution medium and/or host system to include an interface means for facilitating such operation. This interface means can operate in any suitable manner, but preferably at least defines a set of commands that the host processor can use for this operation, and, preferably, also allows the host processor to be able to readily to indicate the application content that is to be processed.

Thus, in a particularly preferred embodiment, there is a defined set of commands that can be used by the host system and the hardware element on the distribution medium when communicating with each other (which will, in effect, define the interface between the host system and the hardware element on the distribution medium, as is known in the art), and furthermore a defined set of memory addresses or indexes that can be used by the host system and the hardware element on the distribution medium to indicate particular application content to be processed. These elements will, in effect define the interface between the host system and the hardware element on the distribution medium.

Thus, in a particularly preferred embodiment, the distribution medium includes a command buffer that stores commands (and preferably also parameters) that can be shared between and/or used by both the host system and the application processing implemented in hardware on the distribution medium, i.e. that is and defines the communications interface between host system and the hardware element on the distribution medium.

Similarly, the distribution medium preferably also includes an index buffer that stores memory indexes (pointers) that can be shared and/or used by both the host system and the application processes implemented in hardware on the distribution medium, to, e.g., indicate particular application content stored on the distribution medium. (This index buffer in effect acts as interface between the actual content stored in the distribution medium, and the host system and the hardware element on the distribution medium (since the host system and the hardware element on the distribution medium will use the indexes to access the application content, and therefore the actual application content itself will be shielded from the host system and the hardware element on the distribution medium (and in particular from the host system).)

These command and index buffers can be implemented as desired. They are preferably implemented on the distribution medium side of the system. For example, they could be implemented as separate addressable logic in the hardware element on the distribution medium, and/or could be stored in memory that can be or is shared between (accessible by) both the host system and the hardware element of the distribution medium.

In a particularly preferred embodiment the application process or processes that is implemented in hardware on the distribution medium can and does operate on application content stored on the distribution medium. (Such content could, e.g., as discussed above, be, in effect, pre-loaded onto the distribution medium, or could, e.g., be stored on the distribution medium in use (e.g. by the host system).) Most preferably, as discussed above, the processes implemented on (i.e. the hardware element of) the distribution medium can access and operate on application content stored on the distribution medium directly (i.e. without the need, e.g., for that content to be provided via the host system).

Thus, according to a sixteenth aspect of the present invention, there is provided a distribution medium for an application for a microprocessor-based system, the distribution medium comprising:

means for storing application content for the application; and a hardware element for processing application content stored on the distribution medium;

wherein the hardware element can access application content that it is to process directly from the storage means of the distribution medium.

In a particularly preferred such embodiment, the application process or processes implemented in hardware on the distribution medium (and thus the hardware element of the distribution medium) operates to transform application content stored on the distribution medium to a different form (which transformed content can then, e.g., be (and preferably is) provided to the host system). This has the advantage because the content will be transformed on the distribution medium, the transformed data only can be provided to the host, thereby removing the need to provide the original data in question to the host system. This can again enhance the security of the system, as not all of the application content (in its original form at least) would need to be made available to the host.

Thus, in a particularly preferred embodiment the hardware element of the distribution medium implements an application process or processes that transforms application content stored on the distribution medium to another form. The hardware element accordingly preferably includes means for transforming application content stored on the distribution medium to another form.

The transformed content is most preferably then provided to the host system for use. This could be done, e.g., either by the distribution medium (e.g. its hardware element) transferring the transformed content to the host (e.g. storing it in the host's memory), or by the transformed content being stored on the distribution medium such that it can then be retrieved by the host.

It is again believed that such an arrangement may be new and advantageous in its own right. Thus, according to a seventeenth aspect of the present invention, there is provided a distribution medium for an application for a microprocessor-based system, the distribution medium comprising:

a hardware element for transforming application content stored on the distribution medium and for making that transformed application content available to a host system executing the application.

In these aspects and arrangements of the invention, the application content to be transformed, and/or the transformation process implemented by the hardware element of the distribution medium, are preferably such that the transformed application content cannot easily be transformed back to its original form, as that further enhances the security provided by such arrangements.

It will be appreciated that in these arrangements, the host system may still implement some application processes and transform some of the application content, whereas other application processes and application content will be implemented and transformed, respectively, in the hardware element on the distribution medium. It is again believed that such arrangements may be new and advantageous in their own right.

Thus, according to an eighteenth aspect of the present invention, there is provided a method of operating a microprocessor-based system that includes a host system for executing an application, and a distribution medium for providing the application to the host system, the distribution medium including a hardware element for transforming some of the application content of the application, the method comprising:

the host system copying application code stored on the distribution medium and using that code to processes application content of the application;

the distribution medium transforming other application content using its hardware element and making the transformed application content available to the host system.

As discussed above, in arrangements where the distribution medium itself acts to transform application content, it may not be (and preferably is not) necessary to provide to the host system the original, untransformed application content. This means that this content need not be stored in memory that is accessible to a host system but can be stored such that it cannot be accessed by the host system. This would again enhance the security of the distribution medium.

Thus, in a particularly preferred embodiment, particularly where the distribution medium itself acts to transform application content, some or all of the application code, and preferably of the application content (and most preferably the application content that will be transformed by the distribution medium and is only needed by the host in its transformed form), is stored in a memory that is not accessible to the host system (and, indeed, is preferably protected against external access attempts in any event). This protected memory could be provided as desired, e.g., by providing a physically separate memory (storage module) that is not accessible to the host, or by using a memory controller that restricts the access of the host to specified memory segments (addresses) in the memory module of the distribution medium. Most preferably the protected memory is (hard) physically separated, e.g., fused off, from any external access (whether by the host or otherwise) to the distribution medium.

In such arrangements, the distribution medium will, in effect, include two memory regions or modules (which could, as discussed above, be provided by the same overall memory unit, as well as by distinct, physically separate memory units), one that stores application code (e.g. content) that is to be accessible to the host system, and one that is not accessible to the host system.

It is again believed that such arrangements may be new and advantageous in their own right.

Thus, according to an nineteenth aspect of the present invention, there is provided a distribution medium for providing an application to a host microprocessor-based system, the distribution medium comprising:

means for storing application code representing the application, wherein some of the application code is stored so that it can be accessed by the host system, and some of the application code is stored so that it cannot be accessed by the host system.

According to a twentieth aspect of the present invention, there is provided a distribution medium for providing an application to a host microprocessor-based system, the distribution medium comprising:

a memory means for storing application content that can be accessed by the host system;

a memory means for storing application content that cannot be accessed by the host system; and means for transforming application content stored in the memory means that cannot be accessed by the host system and for making that transformed application content available to the host system.

These embodiments and aspects of the present invention can and preferably do include any one or more or all of the preferred and optional features of the invention discussed herein. Thus, for example, the "protected" application content is preferably transformed by a hardware element on the distribution medium. Similarly, the transformed application content is preferably made available to the host system by storing it (after transformation) in the "unprotected" memory on the distribution medium.

It will be appreciated that in these embodiments and aspects of the invention, not only can or will some of the application processing be implemented in hardware on the distribution medium and thereby inaccessible to the host system, but some of the application code (e.g. application content) will also be inaccessible to the host. This further enhances the security and copy-protection of the distribution medium.

It should be noted here that the protected memory on the distribution medium could also be used to store, for example, program code relating to processes of the application in such a manner that that program code is protected and shielded from access by the host (or other external access). In such an arrangement, the distribution medium could then be provided with a hardware element in the form of a more general (and, e.g., configurable) processing device, such as a CPU (Central Processing Unit) or an FPGA core (Field Programmable Gate Array), which could then execute the relevant protected program code to carry out the application process or processes in question. In this case, the application process or processes would be implemented by the hardware element on the distribution medium, but would in their "raw" form have or be provided as two components on the distribution medium, namely the hardware element and the protected program code (in the case of a CPU hardware element, for example) or other configuration code or data (e.g. in the case of an FPGA hardware element, for example), stored on the distribution medium (i.e. stored in the protected memory of the distribution medium).

This arrangement provides a further alternative for implementing an application process or processes in hardware on the distribution medium, in addition to the use of a dedicated hardware device as discussed above, namely by providing a more general processor such as a CPU or an FPGA core on the distribution medium, and storing the necessary program code or configuration structure, etc., for the application process or processes in a protected memory on the distribution medium, for execution by the hardware element of the distribution medium.

Such an arrangement would still have enhanced copy protection and performance, because the stored protected program code or configuration data would not be accessible to the host or otherwise from the distribution medium, and, again, some of the application processing would be off-loaded to the distribution medium. Such arrangements may be desirable, e.g., for cost issues, or where, for example, the nature of the application process or processes in question is such that they are more suited to implementation on the distribution medium in this manner.

Indeed, it is believed that such arrangements may be new and advantageous in their own right. Thus, according to a twenty-first aspect of the present invention, there is provided a distribution medium for an application for a microprocessor-based system, the distribution medium comprising:

means for storing code representing a process or processes of the application; and a hardware element for implementing the code representing the process or processes of the application, whereby the hardware element may implement that application process or processes; wherein the code representing the process or processes of the application that is to be implemented by the hardware element of the distribution medium is stored on the distribution medium in such a manner that it cannot be accessed by a host system that is to use the application.

According to a twenty-second aspect of the present invention, there is provided a distribution medium for an application for a microprocessor-based system, the distribution medium comprising:

means for storing code representing a process or processes of the application in such a manner that it cannot be accessed by a host system that is to use the application; and a hardware element for implementing the code representing the process or processes of the application, whereby the hardware element may implement that application process or processes.

According to a twenty-third aspect of the present invention, there is provided a method of manufacturing a distribution medium for an application for a microprocessor-based system, the method comprising:

storing on the distribution medium code representing a process or processes of the application in such a manner that it cannot be accessed by a host system that is to use the application; and providing on the distribution medium a hardware element for implementing the code representing the process or processes of the application, whereby the hardware element may implement that application process or processes.

As discussed above, in this aspect (and embodiments) of the invention, the hardware element may be, and is preferably, in the form of a more general, configurable, programmable, processing device, such as a CPU or FPGA core or a programmable graphics processing engine (unit), with the stored application code that is implemented on the hardware element being, e.g., program code for execution by a CPU, etc., and/or configuration code for configuring an FPGA, to carry out the application process or processes in question.

As discussed above, in other arrangements of the present invention, the application process or processes that are implemented in hardware on the distribution medium are implemented in a hardware element that is, in effect, "hard-wired" or permanently configured to carry out the application processes in question. This has the advantage that no part of the application processes implemented in hardware on the distribution medium will be transferable over an electronic medium, and so may provide increased copy-protection.

It should be noted here that the aspects and arrangements of the present invention can in general, where appropriate, and as desired, use either a dedicated or "hard-wired" hardware element on the distribution medium for carrying out the application processes, and/or use a programmable hardware element, such as a CPU, FPGA core or a programmable graphics processing engine (unit), that executes appropriate software (program code) to carry out the application processes. As discussed above, in the later case, the program code (application logic) to be implemented on the hardware element is preferably stored on the distribution medium in such a manner that it is inaccessible to an external (e.g. host) system.

It would also be possible for the distribution medium to include a combination of some, fixed hardware element(s) and/or functions and other more programmable or configurable hardware elements that are to execute program code. For example, some graphics processing functions could be performed by dedicated hardware units, with other functions being performed by programmable units on the distribution medium.

The present invention is applicable to distribution media for all forms of application to which the present invention can be applied (e.g. that include application processes that can be executed in hardware on the distribution medium). In general the present invention is particularly applicable to applications that include and transform original application content to provide the final output to the user. It is accordingly envisaged that it will have particular (but not exclusive) application for (computer) games and game engines. It would also, e.g., be applicable to database, mapping and navigation applications, where, e.g., all or part of the database or mapping, etc., search application process or processes could be implemented in hardware on the distribution medium. The distribution medium could provide a single application or more than one application (of the same or different types), as desired.

The present invention could also, e.g., be applied to encryption and decryption arrangements, with the hardware element, e.g., comprising a (hardware) decryption and/or encryption circuit for decrypting (or encrypting) content stored on the distribution medium. A host could then, e.g., be provided with an identifier that activates the decryption, etc., circuit to decrypt the stored application content when the application is implemented on that particular host. As the decryption is carried out on the distribution medium, the decryption process can be shielded from the host.

The distribution medium itself may take any suitable form, such as a card or cartridge, etc., as is known in the art.

The present invention can be used in any microprocessor based system that uses distribution media to deliver applications to the system. Thus, as well as being suitable for PC and other computer-based system, it can be used in, e.g., gaming consoles and devices, portable and handheld devices, such as PDAs and mobile telephones, etc. Indeed, it may be particularly advantageous for use in smaller and portable devices that may accordingly have more limited resources.

The present invention accordingly also extends to systems that implement the present invention, and to the use of a distribution medium in accordance with the present invention in such systems.

Thus, according to a twenty-fourth aspect of the present invention, there is provided a system for executing an application, the system comprising:

a distribution medium that stores application code for the application and that includes a hardware element for implementing an application process or processes of the application; and a host system that can copy application code of the application stored on the distribution medium and implement an application process or processes of the application.

According to a twenty-fifth aspect of the present invention, there is provided a system for executing an application, the system comprising:

a distribution medium comprising:
means for storing application code; and
means for implementing at least a part of the application processes of the application in hardware; the system further comprising:

a host system, the host system comprising:
means for retrieving application code from the distribution medium; and
means for implementing the retrieved application code on the host system.

According to a twenty-sixth aspect of the present invention, there is provided a system for executing an application, the system comprising:

a distribution medium comprising:
means for storing application code, including both application content and application program code for the application; and means, preferably in the form of a hardware element, for transforming at least a part of the application content; the system further comprising:

a host system, the host system comprising:
means for retrieving application code from the distribution medium; and
means for implementing the retrieved application code on the host system.

According to a twenty-seventh aspect of the present invention, there is provided a distribution medium for providing an application to a microprocessor-based system, the distribution medium comprising:

means for storing application code representing the application, including application content; and a hardware element for processing some or all of the application content stored on the distribution medium.

Although the present invention has been described with reference to the hardware element of the distribution medium implementing application processes of the application, other application code that can be implemented in hardware could be similarly implemented. For example, application content such as hard-coded encryption keys (keys in hardware), vertex or texture graphics content, and look up tables for mathematical operations, could also be embodied in hardware.

Thus, according to a twenty-eighth aspect of the present invention, there is provided a distribution medium for an application for a microprocessor-based system, the distribution medium comprising:

means for storing application code for the application; and means for implementing at least a part of the application code of the application in hardware.

According to a twenty-ninth aspect of the present invention, there is provided a distribution medium for an application for a microprocessor-based system, comprising:

memory means for storing code representing the application; and a hardware element for implementing code of the application.

According to a thirtieth aspect of the present invention, there is provided a distribution medium for an application for a microprocessor-based system, in which the application is provided by both hardware and software elements of the distribution medium.

According to a thirty-first aspect of the present invention, there is provided a distribution medium for an application for a microprocessor-based system, in which the application is represented in both hardware and software on the distribution medium.

As will be appreciated by those skilled in the art, all of the aspects and embodiments of the invention discussed and described herein can, and preferably do, include, as appropriate, any one or more or all of the preferred and optional features of the invention described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The invention also extends to a computer software carrier comprising such software which when used to operate a microprocessor-based system comprising data processing means causes in conjunction with said data processing means said system to carry out the steps of the or a method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of a method or of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

Like reference numerals are used for like components throughout the Figures.

Figure 1:
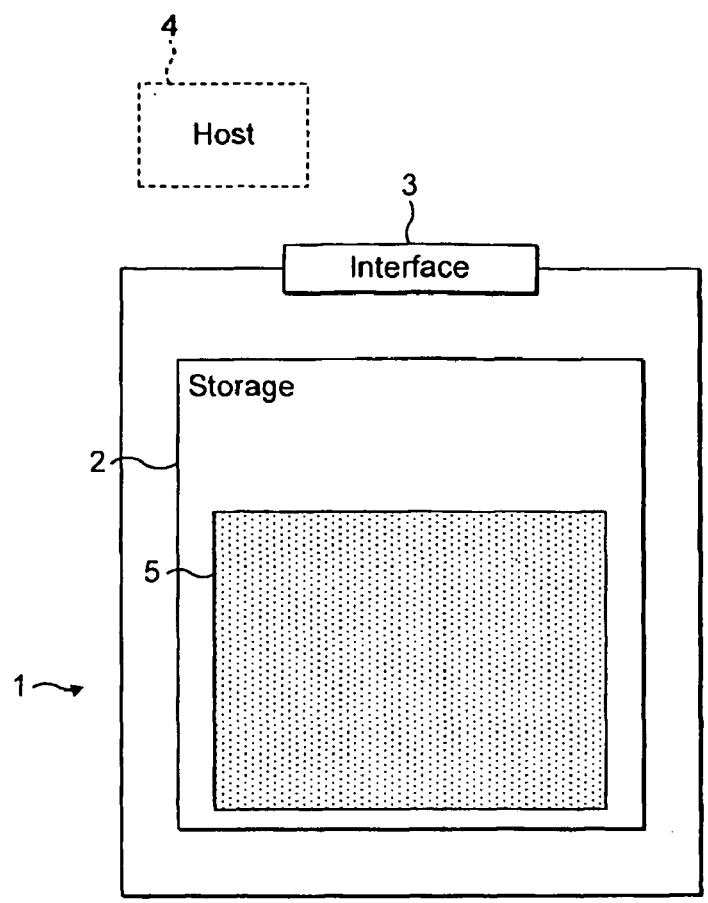
FIG. 1 shows schematically a prior art distribution medium.
Figure 2:
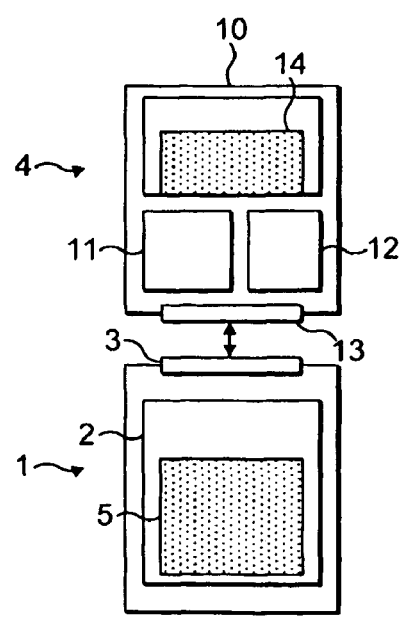
FIG. 2 shows schematically the interaction between the distribution medium of FIG. 1 and a host system in use.
Figure 3:
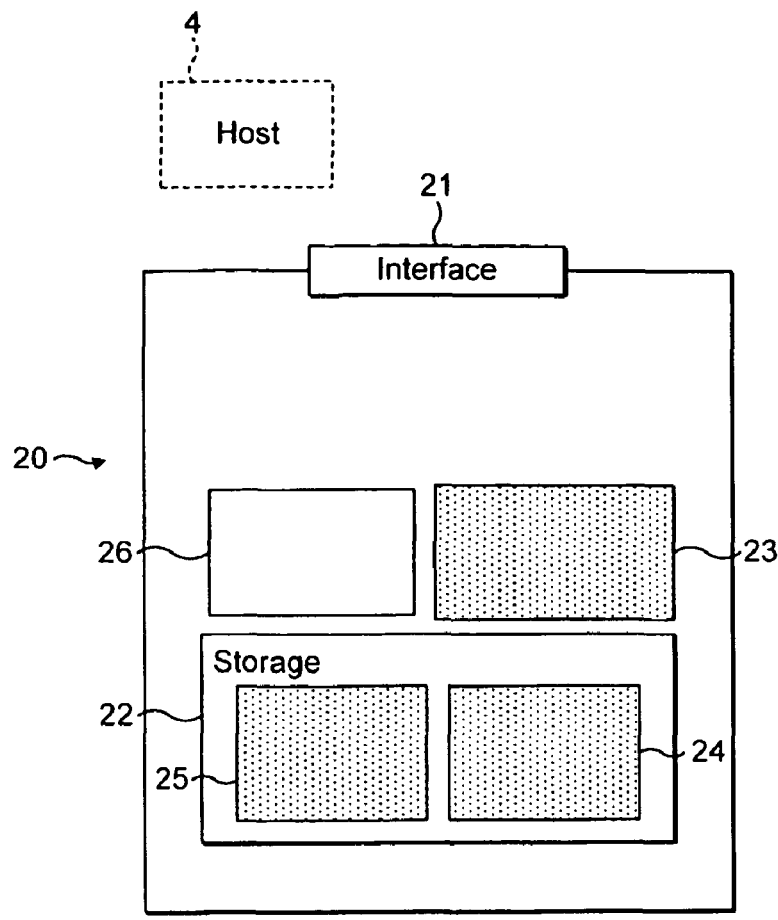
FIG. 3 shows schematically a first embodiment of a distribution medium in accordance with the present invention.

FIG. 3 shows a first preferred embodiment of a distribution medium in accordance with the present invention. The distribution medium 20 is intended to provide an application to a host system 4, and accordingly includes a suitable interface element 21 for interfacing with the host 4.

The distribution medium 20 includes a memory or storage module 22 that stores application code representing the application that is to be provided to the host system 4. This storage module 22 can be of any suitable form, such as a semiconductor, optical or magnetic or other storage medium.

In accordance with the present invention, the distribution medium 20 also includes a hardware element 23 that implements some of the application processes for the application that is to be provided by the distribution medium.

This hardware element 23, is in the form of a semiconductor device that comprises, e.g., transistors, or other firm entities, that are not transferable over an electronic medium. (However, other arrangements, such as optical systems, would be possible.) It is capable of directly accessing application code stored in the memory 22 and implements parts of the application processes for the application in question. In the present embodiment, the hardware element 23 in particular, as will be discussed below, processes application content stored in the memory 22 to transform that content to another form, and then provides the transformed content to the host system 4.

In this embodiment, the storage module 22 is divided into two distinct memory or storage units, a first, "unprotected" memory 24, and a second "protected" memory 25.

The unprotected memory 24 can be accessed directly by both the host system 4 and the hardware element 23 of the distribution medium and is used to store application code (programs and/or content) that is to be accessible to both the host 4 and the hardware element 23.

The protected memory 25, on the other hand, can only be accessed by the hardware element 23 of the distribution medium 20 (and in particular cannot be accessed by the host 4). This "protected" memory 25 is used to store application code (programs and/or content) that is to be accessible to the hardware element 23 of the distribution medium 20, but that is not to be accessible to the host 4.

In the present embodiment these two different memory areas 24, 25 are provided by means of an access controller 26 that is configured to allow the host 4 to address only the memory segments in the "unprotected" memory 24 of the storage module 22. However, alternative arrangements, such as physically separated memory areas 24 and 25 would be possible. Indeed, it may be preferable to physically separate the protected memory 25 from any form of external access to the distribution medium 20. For example, two physically distinct storage modules (e.g., flash memory, ROM, RAM, magnetic or optical storage, etc.) could be used.

Figure 4:
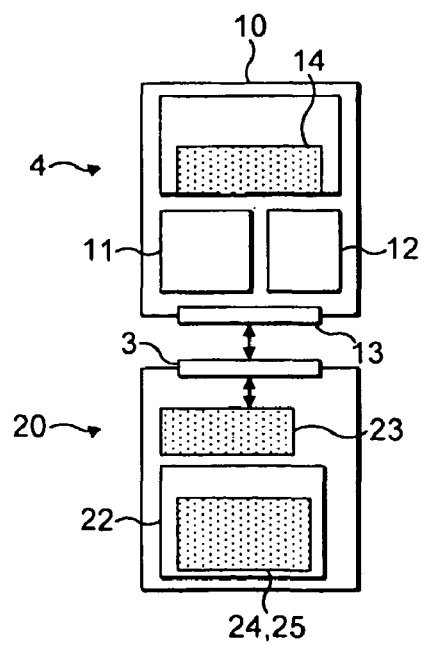
FIGS. 4, 5 and 6 show schematically the interaction between the distribution medium of FIG. 3 and a host system in use.

FIG. 4 shows schematically the operation of the host system and distribution medium 20 of the present embodiment.

As shown in FIG. 4, the host system 4 will, as in the prior art systems, copy some of the application code to its host storage 10 and then implement that copied application code 14 on its CPU or other processing device 11. However, in contrast with the prior art systems, some of the application processes of the application are implemented as the hardware element 23 on the distribution medium 20 (rather than, e.g., being stored as program code for execution on a microprocessor of the host system).

In particular, in the present embodiment, the hardware element 23 of the distribution medium will access data (application content) stored in the protected memory 25 and perform operations on that application content to transform it to a different form and then store the result in the unprotected memory 24 so that the transformed data can then be accessed by the host. The application content that is transformed by the hardware element 23 and the transformation process itself (i.e. defined by the application process implemented by the hardware element 23) are of a form such that the transformed application content cannot easily be transformed back to its original form by or from the host 4.

The effect of this is that in this embodiment, the host system 4 will both receive "raw" application code from the unprotected memory 24 (and, e.g., store that data in its storage means 10), and also receive from the hardware element 23 of the distribution medium 20 processed data comprising the protected application content 25 that has been transformed by the hardware element 23 of the distribution medium.

The distribution medium can therefore be considered to include both "unprotected" application code, namely that application code (program and content) that is directly copied to and processed by the host system 4 from the "unprotected" memory 24, and, also, "protected" application code, namely the application program code that is implemented as the hardware element 23 of the distribution medium and the application content that is transformed by the hardware element 23 and only provided to the host 4 in its transformed form. (It should be noted here that the application program code that is implemented in the form of the hardware element 23 of the distribution medium is not otherwise stored in any form on the distribution medium 20.)

Figure 5:
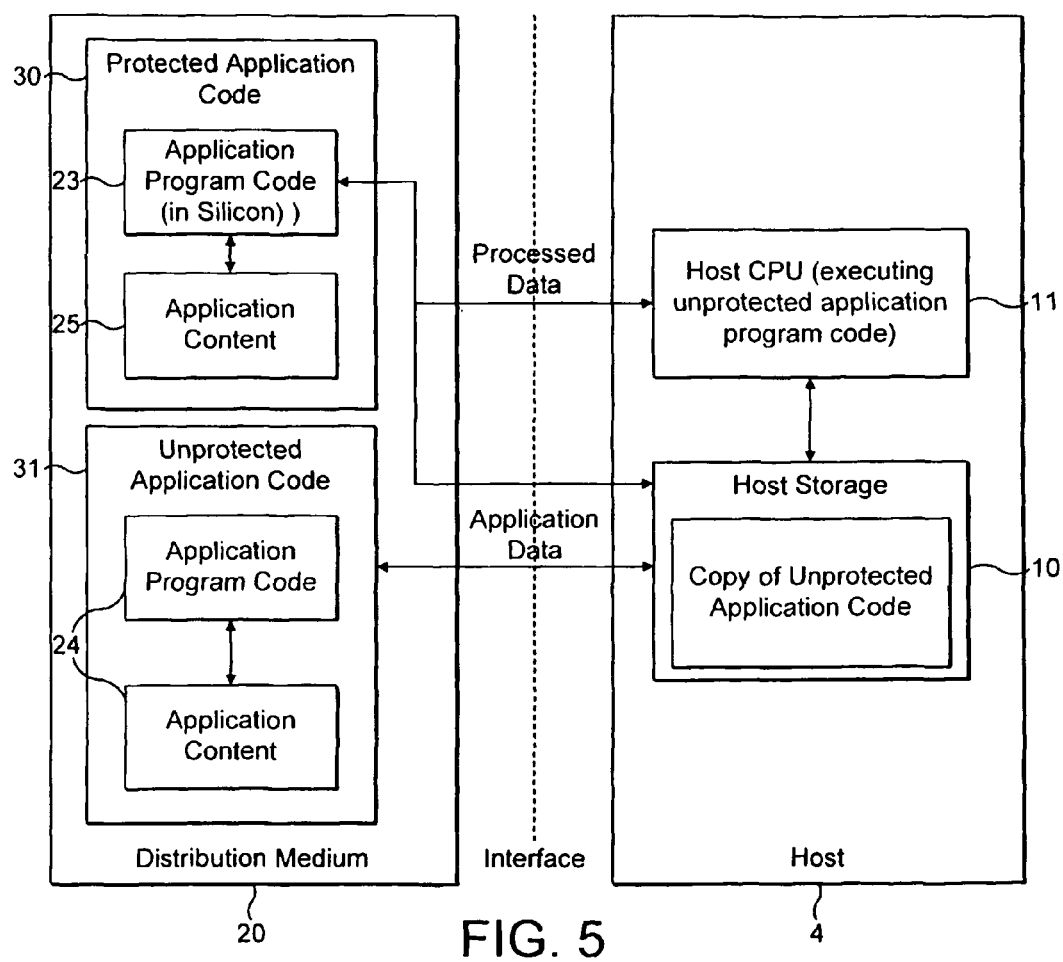

FIG. 5 shows schematically this arrangement of the application code and its processing. As shown in FIG. 5, the distribution medium 20 can be considered to include both protected application code 30, which is the application program code implemented as the hardware element 23 of the distribution medium 20 and the application content transformed by the hardware element 23 that is stored in the protected memory 25, and "unprotected" application code 31, that is the application content (and application program code, where appropriate), that is stored in the unprotected memory 24 and that is to be directly accessed by and used by the host 4.

In order to facilitate this operation, the distribution medium further includes means to allow and control communication between the host system 4 and the hardware element 23 on the distribution medium, i.e. to provide an interface between the host system 4 and the hardware element 23 on the distribution medium. This interface arrangement is arranged in particular to allow the hardware element 23 on the distribution medium to instruct the host system (e.g., the application program code (process or processes) executed on the host CPU) to perform an operation (e.g., on the unprotected application content or otherwise), and vice-versa (i.e. to allow the host CPU to instruct the hardware element 23 of the distribution medium to perform an operation, e.g., on the application content or otherwise).

In the present embodiment, this interface means comprises a command/parameter buffer 42 and an index buffer 43 that interface between the hardware element 23 of the distribution medium 20 and the application program code 41, etc., that is implemented on the host system 4. This is shown schematically in FIG. 6.

Figure 6:
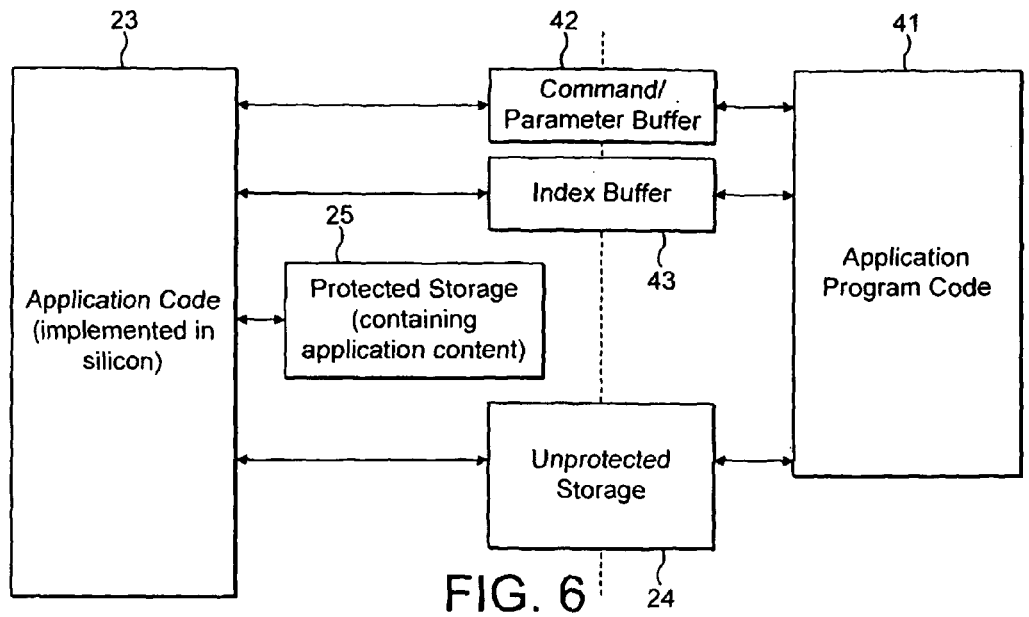

The command buffer 42 and the index buffer 43 can be implemented as desired, for example either as a separate addressable program logic in the hardware element 23 of the distribution medium, or, e.g., in unprotected memory shared between (i.e. accessible by both) the hardware element 23 of the distribution medium and the host system 4, or, e.g., as a combination of the two. In FIG. 6, the command buffer 42 and index buffer 43 are shown as separate independent blocks for clarity, although that is not essential to their arrangement.

The communication between the hardware element 23 and the application program code 41 implemented on the host system via the command/parameter buffer 42 and the index buffer 43 can be bi-directional as shown in FIG. 6. However, this is not essential. The nature of the communication will, for example, depend on a particular application's hardware-software partitioning of the application's application processes and the nature of the application's application processes themselves.

The command/parameter buffer 42 stores commands and parameters that can be jointly used by and sent to both the hardware element 23 and the application program code 41 implemented on the host system (i.e. it in effect defines a common set of commands for use by the system). In the present embodiment, these commands include commands to instruct the hardware element 23 or the application process or processes 41 implemented on the host system to perform some form of transform operation on indicated application content using different parameters stored in the command buffer. There are no limitations to the set of commands that can be stored in the command buffer 42, although in the present embodiment the command buffer 42 is arranged so as not to permit the copying or moving of data stored in the protected memory 25 to the unprotected memory 24 of the distribution medium 20, and no commands that let the original, untransformed application content be easily reproduced are allowed.

The index buffer 43 stores memory indexes (e.g. pointers) that can be used by both the hardware element 23 of the distribution medium and the application process or processes 41 implemented in the host system. These memory indexes point to given memory locations and may also indicate the nature of the memory content that they point to (either in themselves, or by virtue of the context of their use). They can and do point to both protected and unprotected memory. (In this regard, it should be noted that while any index to the protected memory that is accessible to the application process or processes 41 implemented on the host system will point to the protected memory and may indicate the nature of the content that the index points to, the memory content itself will still only be accessible to the hardware element 23 of the distribution medium. Thus the use of the index buffer 43 shields that stored application content from the host system (and indeed is used, inter alia, for that reason).)

In use, the command/parameter 42 and the index buffer 43 will be used to instruct the hardware element 23 of the distribution medium, and the application process or processes 41 implemented on the host system to carry out operations of a form such as transform data in a given memory address with a given set of parameters and store the result in another memory address. For example, a typical command operation to the hardware element 23 of the distribution medium might be instruct that hardware element to transform data stored in a particular protected memory address with a given set of parameters from the command/parameter buffer 42 and store the result of the transformation in a given unprotected memory address (i.e. so that it can then be accessed by the host system).

It can be seen from the above that in the distribution medium of the present embodiment some of the application process or processes are implemented in hardware on the distribution medium, and, some of the application content is stored in a protected memory that is not accessible to a host system. This provides enhanced protection for that application code, since the host 4 cannot get access to those parts of the application program code logic and content, thereby making it more difficult for a hostile host to reconstruct or redistribute them in another medium.

Furthermore, because the hardware element 23 will act as a processing element in itself, that can reduce the burden on the host system when executing the application, thereby making it possible to, for example, effectively enhance the performance of the host system.

Figure 7:
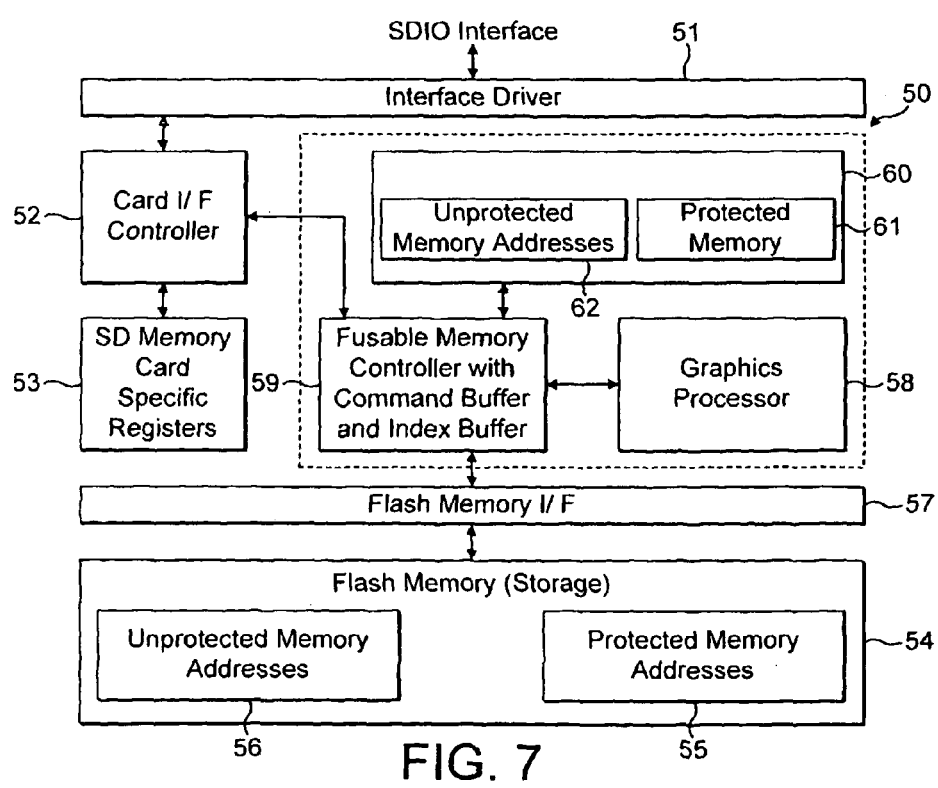
FIG. 7 shows a second embodiment of a distribution medium in accordance with the present invention.

FIG. 7 shows a further embodiment of a distribution medium that is in accordance with the present invention. In this embodiment, the distribution medium is in the form of a memory card that provides a game as its application.

A game can usually be considered to consist of two main components, namely a game engine which comprises processes for performing graphics, audio, artificial intelligence, physics, user input/output, etc., operations or processes, and the relevant data and information, i.e. game content, that is to be processed by these processes as part of the game, which content can include, for example, audio, graphics (e.g. meshes, objects, textures), video, images, etc., information and data. As is known in the art, in typical prior art game application distribution media, the above game processes are represented by means of program code stored on the distribution medium, and the game content is stored as data on the distribution medium.

Thus, as is known in the art, computer games are typically distributed on a memory card, such as an MMC or SD card, that comprises a flash memory (or other form of storage) and an interface describing a protocol specific to a communications standard to allow a host system to access and use the game. Once installed on a host system, the host system's CPU, for example, will copy all or parts of the stored game content and program code to its host memory, and then execute the game using the game data (code) that it has stored in its memory. Any new data that is required as the game progresses (such as new level data) will be fetched by the host from the game card as needed.

However, in the present embodiment, unlike in prior art systems, the graphics processes of the game are not stored as appropriate program code on the distribution medium for execution by the host system, but instead a hardware element in the form of a graphics processor is provided on the distribution medium for implementing and carrying out those processes. In particular, the game "processes" describing the transformation of game graphics content are carried out and implemented by the graphics processor on the distribution medium, rather than being stored as program code for implementation and execution on the host system. Furthermore, the graphics content that is to be transformed by the graphics processor on the distribution medium is stored in a protected memory such that it cannot be accessed by the host system. FIG. 7 illustrates this.

As shown in FIG. 7, the distribution medium 50 of this embodiment again includes an interface driver 51, an interface controller 52 and appropriate memory registers 53 to facilitate communication between the host system and the distribution medium. It also include storage module 54 in the form of a flash memory that includes both a protected memory 55 and an unprotected memory 56 (which function in the same way as discussed in the previous embodiment). A flash memory interface 57 is also provided for facilitating access to the memory 54.

The distribution medium 50 also includes a hardware element 58 that implements parts of the application processing. In this embodiment, the hardware element 58 is, as discussed, in the form of a graphics processor which is configured to carry out the graphics processes that are defined as part of the game, and in particular to transform graphics content of the game to its final output form before it is provided to the host system.

As in the previous embodiment, the distribution medium again includes a command buffer and index buffer which in the present embodiment are integrated into a memory controller 59. These elements function to interface between the graphics processor 58 of the distribution medium and the host system, as discussed above. The memory controller 59 is fusible and acts, inter alia, to separate the flash memory 54 and intermediate working memory 60 (see below) of the distribution medium.

Finally, an intermediate working memory 60 for the graphics processor 58, which memory again includes both protected memory addresses 61 and unprotected memory addresses 62, is provided. In this embodiment, this memory 60 is in the form of, e.g., 1 MB of, SRAM, although other arrangements are, of course, possible. This memory is provided, inter alia, for the fast storage of data generated by the graphics processor 58.

In use of the distribution medium of this embodiment, the host system's CPU, for example, will copy all or the necessary game application code, including both game content and any game program code that is not related to graphics processing to its host memory before the game is executed. The game will then be executed from the host memory, and all non-graphics related content will be stored in the host memory, as would normally be the case. The host may also obtain memory indexes and an indication of the nature of the content for graphics data stored on the distribution medium, as it may need this information in order to be able to issue the appropriate graphics processing commands to the graphics processor 58 of the distribution medium 50.

However, in the case of graphics processing, rather than the graphics processing being implemented on the host system, the host system will instead send commands to the graphics processor 58 of the distribution medium 50 (using the interface established by the command and index buffers 59), instructing the graphics processor 58 which graphics content to manipulate and how to transform that data. The graphics processor 58 on the distribution medium 50 will then access the relevant graphics content and transform it, as appropriate. During this process, all intermediate graphics content and data will be stored on the distribution medium itself (in the "protected" part of the working memory 60). Once the final graphics frame buffer has been generated, the graphics processor 58 will store that frame buffer in the unprotected memory 62 for access by the host system and inform the host system's CPU (again via the command and index buffers 59) that it can copy that frame buffer to its own local memory for display.

In this embodiment, the graphics processor 58 works autonomously per frame, and so the host will generate all necessary commands and data structures that the graphics processor 58 will need to process the data and produce the final frame buffer. Other arrangements are, of course, possible.

Thus, in this system, it can be seen that the host system has access to non-graphics related content of the game, and the appropriate command and index buffers and unprotected memory shared between the host system and the distribution medium. The graphics processor 58 on the distribution medium has access to the protected graphics content on the distribution medium and to the shared command and index buffer and memory.

In this way copy protection for the game on the distribution medium is enhanced, since the game's graphics processes are implemented by the graphics processor of the distribution medium and the game's graphics content is stored in protected memory.

A further advantage of the arrangement of this embodiment is that because the graphics processing is carried out on the distribution medium, that processing is offloaded from the host system, and, furthermore, can be made host independent (i.e. such that the distribution medium will give the same graphics performance and visuals on all host systems).

Although the above embodiment has been described with reference to the graphics processing of the game being carried out in hardware on the distribution medium, other aspects of the game processing could also (or instead) be implemented in hardware on the distribution medium if desired. However, graphics processing is particularly suitable for such implementation, since the result of the graphics operations is a relatively well defined set of data, namely the frame buffer, that can simply be provided to the host system for display.

Figure 8:
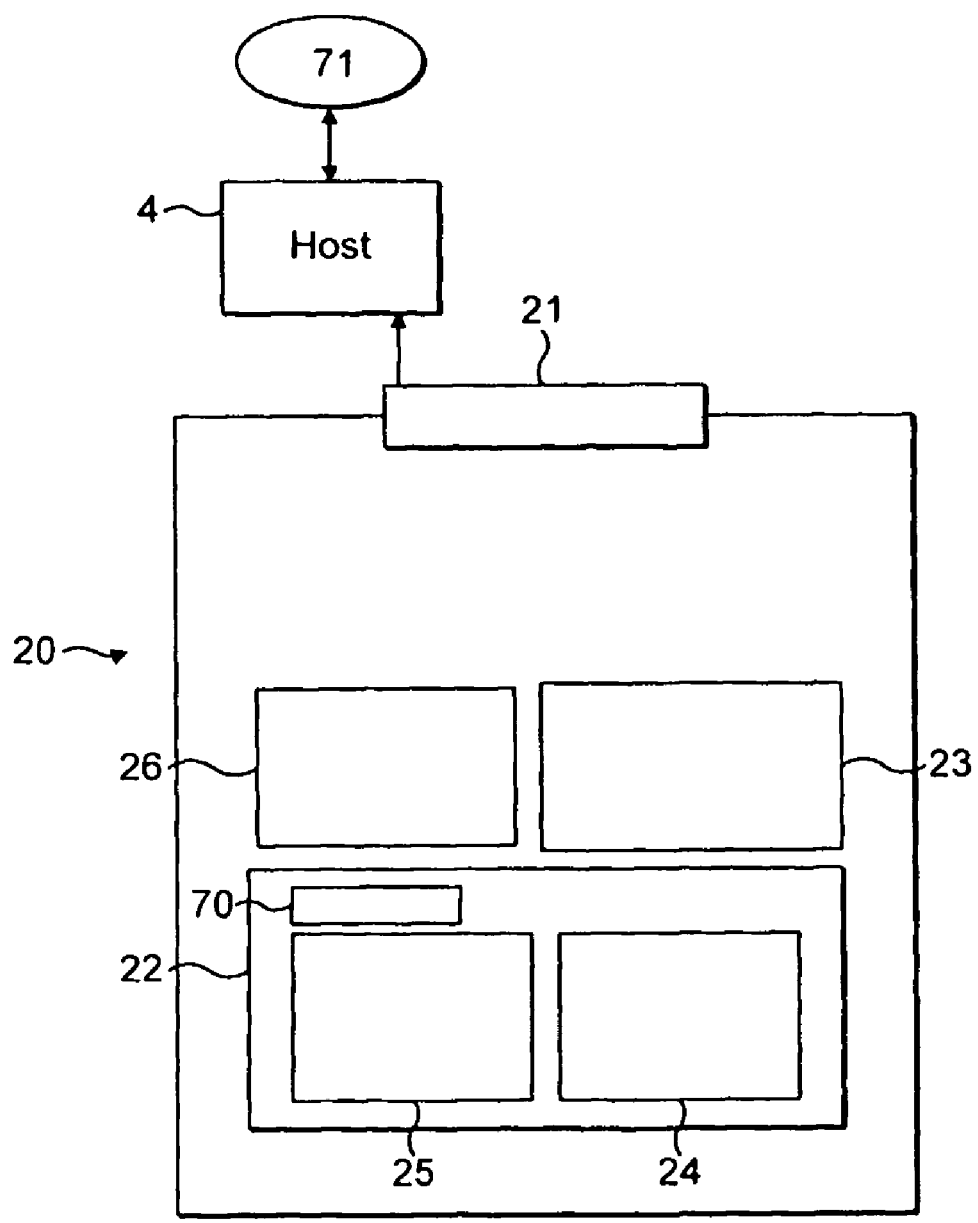
FIG. 8 shows a third embodiment of a distribution medium in accordance with the present invention.

FIG. 8 shows a further preferred embodiment of a distribution medium in accordance with the present invention.

As shown in FIG. 8, the distribution medium 20 of this embodiment again includes an interface element 21, a hardware element 23, a storage module 22 that includes both a protected memory 25 and an unprotected memory 24, and a memory access controller 26. The distribution medium of this embodiment is intended to operate in a similar manner to the preceding embodiments, but in addition to the host 4 retrieving and receiving application code and content from the distribution medium 20, the system is configured such that the host 4 will also retrieve application content from a server 71 of an external network, such as the Internet, to which the host 4 is coupled. In other words, as well as the host 4 receiving application content from the distribution medium 20, it is also arranged to, when the application is to be or is being executed, download application content from an external source 71.

In order to facilitate this operation, the distribution medium 20 has stored in its memory 22 a set of data 70 in the form of identification keys which contain commands and/or data to instruct the host 4 to, and to allow the host 4 to, download the relevant application content from the external source 71.

Each identification key in the data 70 in this embodiment comprises a pointer giving a server location (such as fxi.server.com), a unique content identifier for the content to be retrieved from the server (such as APPLICATION_ID), an identifier for the distribution medium (such as CARD_ID), an identifier for the host device (i.e. that is executing the distribution medium, such as PHONE_MODEL), the device's phone SIM address, and an encryption key (to allow the retrieved content to be encrypted for its, e.g. over-the-air, transmission to the host device, and then decrypted on the host device).

As well as the data discussed above, either the distribution medium 20 or the host 4 (or both) include in this embodiment a pre-installed application for managing the server lookup and the downloading of the retrieved code (content). Using the exemplary data set out above, this application could, e.g., comprise:

send (fxi.server.com, APPLICATION_ID, CARD_ID, PHONE_MODEL)
decrypt (fxi.server.com, APPLICATION_ID, CARD_ID, PHONE_MODEL)
install (fxi.server.com, APPLICATION_ID, CARD_ID, PHONE_MODEL)

or similar. This exemplary application shows a decryption stage. This would, of course, be unnecessary if the received data is not encrypted.

In use of this distribution medium, the host 4 will identify and retrieve an identification key 70 from the distribution medium and use the data in the identification key to retrieve the indicated application content from the external server 71. The host 4 will then process the retrieved content accordingly, whilst simultaneously copying and executing any other application content that it requires from the distribution medium 20.

An advantage of this arrangement is that the host 4 can, for example, be provided with updated application content via the external source 71, but without the need to use a new distribution medium 20.

Figure 9:
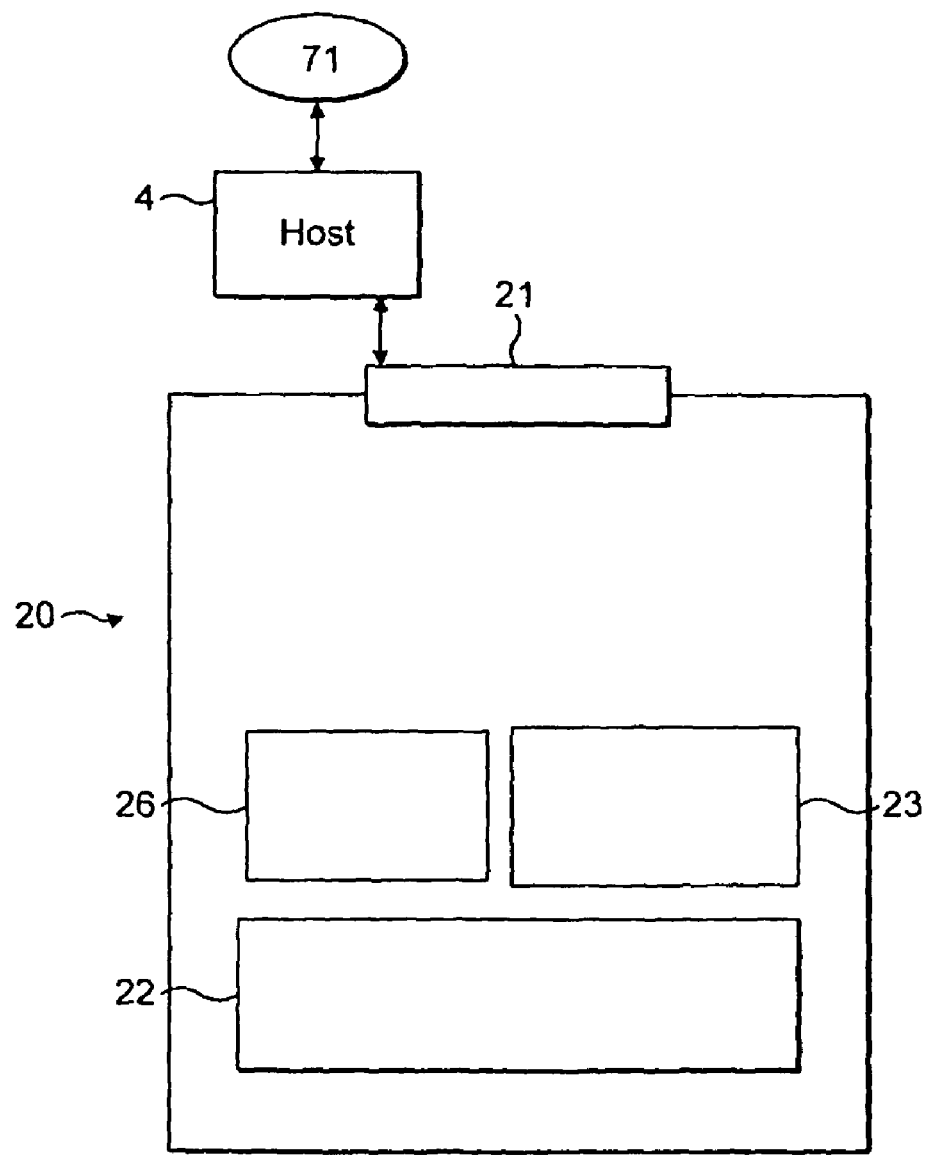
FIG. 9 shows a fourth embodiment of a distribution medium in accordance with the present invention.

FIG. 9 shows a further preferred embodiment of a distribution medium that is in accordance with the present invention. In this embodiment, the distribution medium again has an interface element 21, a hardware element 23, a storage module (memory) 22 and a memory access controller 26. However, in this case, the distribution medium, when it is supplied, does not store any application code (e.g. content) in its memory 22 (i.e. the distribution medium 20 is not "preloaded" with application code), but rather the arrangement is such that the host system 4 will in use store application code, e.g. that it retrieves from an external source 71, in the memory 22 of the distribution medium as required.

Thus, in operation of this embodiment of the present invention, the host system will first download desired application code from an external source, such as a server 71. It will then store some or all of the retrieved application code in the memory 22 of the distribution medium 20 (i.e. push that data onto the distribution medium 20), such that that application code (e.g. content) can then, for example, be processed by the hardware element 23 of the distribution medium 20.

The retrieved code can be stored on the distribution medium 20 in any desired manner. Where, e.g., the code is already in a form suitable for the distribution medium (e.g. in the case of a graphics application, it comprises suitable program code (e.g. shader programs) and application content (e.g. textures and vertex data)) then the code can simply be copied over to the memory 22 of the distribution medium. In other arrangements, a pre-processor on the host system (or distribution medium) could be used to place the code in the desired form before it is stored (e.g. to organise the application content and patch the code to index the application content).

In effect, in this arrangement a "blank" distribution medium having the necessary hardware element and memory elements for execution of an application is provided, but the actual application content, for example, is not provided by the distribution medium, but is instead retrieved in use by the host system 4 from an alternative source.

It should be noted that in this arrangement there is no requirement for the distribution medium to store any data to allow the host system to retrieve (download) the relevant code. Rather, a preferred arrangement for this embodiment is for the user to be able to download an application at their own will, with the host system (e.g. via a piece of software) then automatically copying the application code and content needed over to the "blank" distribution medium once the "downloaded" application has been installed.

A preferred arrangement for this embodiment is thus for the whole application to be downloaded from another source, and for the distribution medium to be used as a graphics accelerator for the application (e.g. for the hardware element of the distribution medium to comprise a graphics processor).

It would, of course, also be possible to have an arrangement in which some application code or content is already stored on the distribution medium 20, but the host system then stores or causes to be stored additional application code, such as application content, on the distribution medium (e.g. for then processing by the hardware element 23 of the distribution medium).

Although the present invention has been described above with particular reference to game applications and the provision of a graphics processor on the distribution medium, as discussed above and as will be appreciated by those skilled in the art, the present invention is applicable to other applications and hardware implementations. For example, it will be applicable to database applications, such as mapping applications, where, for example, any proprietary or defined searching processes that are provided as part of the application could instead be implemented in hardware on the distribution medium. Similarly, where an application includes, for example, audio or other processes, those processes could be implemented in hardware on the distribution medium rather than being provided in the form of program code for execution by a host system.

As can be seen from the above, the present invention provides a system that allows enhanced copy protection and potentially improved performance for applications distributed via distribution media for use in microprocessor-based systems. This is achieved in particular by implementing the application both in hardware and software (rather than all in software as previously) on the distribution medium. This enhances, e.g., the copy protection for the application.

Furthermore, implementing some of the application in hardware also means that it can be possible to avoid the need to provide some of the original software application code to a host system, thereby allowing, for example, that data to be physically separated from and thus protected from the host system.

For example, where the hardware element on the distribution medium accesses and processes original application content stored on the distribution medium and transforms it into another form before it is made available to the host, that original application content can be physically protected from and separated from the host, thereby again making it more difficult for the host to reconstruct or redistribute that application content in another form.

The performance of the combined host system and distribution medium can also be enhanced by the provision of the hardware element on the distribution medium.

In particular, by implementing application processing in hardware on the distribution medium, that application processing need no longer be performed by the host system. This can, e.g., reduce the computational burden on the host when executing the application, and, indeed, can allow the application to be executed on a host with limited resources (such as limited memory and computational resources). For example, many multimedia applications, such as 3D games, put a very high computational burden on processing devices, such that, e.g., in practice a host platform may need to include additional hardware resources such as graphics accelerators in order to be able to use the application. By instead providing such hardware resources on the distribution medium itself, that would allow such applications still to be implemented on host systems that may not in themselves include the necessary resources.

Furthermore, the implementation of the application processing that is carried out by the hardware element on the distribution medium can be made independent of the capabilities and performance of the host system (because that application processing is implemented by the hardware element on the distribution medium rather than on the host system).

The invention claimed is:

1. A distribution medium for providing an application to a microprocessor-based host system for execution by the microprocessor-based host system, the distribution medium comprising:
a hardware element for providing a process or processes of the application,
a memory means that can be accessed by both the host system and the hardware element, and
a memory means that can be accessed only by the hardware element wherein the memory means that can be accessed by both the host system and the hardware element stores content for the application that is to be processed by the host system;

wherein the memory means that can be accessed only by the hardware element stores application content that is to be processed by the hardware element of the distribution medium; and wherein the hardware element of the distribution medium for providing the process or processes transforms the application content stored on the memory means that can be accessed only by the hardware element into a transformed application content and makes the transformed application content available to the host system.

2. The distribution medium of claim 1, wherein the application includes both application content and an application process or processes, and each of the memory means of the distribution medium stores application content for the application.

3. The distribution medium of claim 2, wherein the application process or processes that is or that are implemented in hardware on the distribution medium comprise one or more of:
- graphics processes,
- audio coding and decoding, and
- video coding and decoding.

4. The distribution medium of claim 3, wherein the application process or processes that is or that are implemented in hardware on the distribution medium operate on application content stored on the distribution medium.

5. The distribution medium of claim 4, wherein the hardware element of the distribution medium implements at least one of the application process or processes that transforms application content stored on the distribution medium that can only be accessed by the hardware element.

6. The distribution medium of claim 5, wherein the application process or processes that is or that are implemented in hardware on the distribution medium comprise a process or processes for transforming graphics application content stored on the distribution medium that can only be accessed by the hardware element.

7. The distribution medium of claim 6, wherein the application process or processes that is or that are implemented in hardware on the distribution medium comprise a process or processes for providing the result of the transforming to a host system.

8. The distribution medium of claim 1, further comprising:
a memory that stores memory indexes that can be at least shared or used by both a host microprocessor-based system and application processes implemented in hardware on the distribution medium.

9. The distribution medium of claim 1, wherein the memory on the distribution medium that can be accessed only by the hardware element is not accessible to a host system and stores program code relating to processes of the application.

10. A distribution medium for an application for a microprocessor-based system, the distribution medium comprising:
means for storing code representing a process or processes of the application; and
a hardware element configured to implement the code representing the process or processes of the application, wherein the code representing the process or processes of the application that is to be implemented by the hardware element of the distribution medium is stored on the distribution medium in such a manner that it cannot be accessed by a host system that is to use the application.

11. The distribution medium of claim 10, for a computer game, in which the game includes one or more graphics processing processes, and in which all or part of the graphics processes defined by the game are provided by the hardware element.

12. The distribution medium of claim 10, wherein the application comprises at least one of:
a game or game engine,
a database, mapping or navigation application,
an encryption application, and
a decryption application.

13. The distribution medium of claim 12, further comprising:
means for storing data to allow a microprocessor-based system to retrieve application code for the application from a source external to the distribution medium.

14. A distribution medium of claim 12, further comprising:
memory means for storing data to allow a microprocessor-based system to retrieve application code for the application from a source external to the distribution medium.

15. The distribution medium of claim 14, comprising means for storing data received from an external source in use.

16. A method of operating a microprocessor-based system that includes a host system for executing an application, and a distribution medium for providing the application to the host system, the distribution medium including a hardware element for transforming application content which is not available to the host system of the application, the method comprising:
copying, by the host system, application code stored on the distribution medium and using the application code to process the application content of the application; and
transforming, by the distribution medium, other application content stored in a memory not accessible to the host system using the hardware element to generate transformed application content and making the transformed application content available to the host system.

17. The method of claim 16, comprising the host system retrieving application code from a memory external to the distribution medium.

18. The method of claim 17, comprising:
the host system using data stored on the distribution medium to retrieve code for the application from a source external to the distribution medium.

* * * * *